(12) United States Patent
Childers et al.

(10) Patent No.: US 7,230,657 B2
(45) Date of Patent: Jun. 12, 2007

(54) LIGHT EMITTING DEVICE PROJECTION METHODS AND SYSTEMS

(75) Inventors: Winthrop D. Childers, San Diego, CA (US); William J. Allen, Corvallis, OR (US); Thomas B. Pritchard, Brush Prairie, WA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 527 days.

(21) Appl. No.: 10/776,451

(22) Filed: Feb. 10, 2004

(65) Prior Publication Data

US 2004/0160536 A1    Aug. 19, 2004

Related U.S. Application Data

(63) Continuation-in-part of application No. 10/419,321, filed on Apr. 19, 2003, and a continuation-in-part of application No. 10/349,047, filed on Jan. 21, 2003, which is a continuation-in-part of application No. 10/309,425, filed on Dec. 3, 2002, and a continuation-in-part of application No. 10/138,765, filed on May 3, 2002.

(51) Int. Cl.
    *H04N 3/26* (2006.01)

(52) U.S. Cl. .................. 348/745; 348/744; 348/801; 349/61; 349/69

(58) Field of Classification Search .......... 348/745, 348/744, 750, 751, 759, 761, 801, 802, 790, 348/792, 800, 716, 746, 747; 349/66, 69, 349/77, 7, 61, 62

See application file for complete search history.

(56) References Cited

U.S. PATENT DOCUMENTS

| 4,952,031 | A | * | 8/1990 | Tsunoda et al. ............ 349/24 |
| 5,715,021 | A | | 2/1998 | Gibeau et al. |
| 5,801,800 | A | * | 9/1998 | Wright et al. ............. 349/77 |
| 5,818,546 | A | | 10/1998 | Opower et al. |
| 5,874,929 | A | | 2/1999 | Opower et al. |
| 6,151,001 | A | | 11/2000 | Anderson et al. |
| 6,154,259 | A | | 11/2000 | Hargis et al. |
| 6,170,953 | B1 | | 1/2001 | Lee et al. |
| 6,185,002 | B1 | | 2/2001 | Askeland et al. |
| 6,195,184 | B1 | | 2/2001 | Chao et al. |
| 6,243,055 | B1 | | 6/2001 | Fergason |
| 6,414,661 | B1 | | 7/2002 | Shen et al. |
| 6,426,781 | B1 | | 7/2002 | Lee |
| 2002/0141069 | A1 | | 10/2002 | Hubby, Jr. |
| 2003/0058228 | A1 | | 3/2003 | Katoh et al. |

FOREIGN PATENT DOCUMENTS

WO    WO 02/21850 A2    3/2002

* cited by examiner

*Primary Examiner*—Michael H. Lee

(57) ABSTRACT

Tools for directing a collection of light emitting devices toward pixel locations to make an image are disclosed. A pixel location is a light emitting device target at least twice during a given frame, and each light emitting device in the collection is directed toward at least two different pixel locations during the frame. Adjacent light emitting devices may be directed toward adjacent pixel locations or toward nonadjacent pixel locations.

32 Claims, 7 Drawing Sheets

| SCAN NUMBER | LED ROW | VIEWING SURFACE ROW |
|---|---|---|
| 1, 2, 3, 4, 5 | 1 | 1, 2, 3, 4, 5 |
| 1, 2, 3, 4, 5 | 2 | 6, 7, 8, 9, 10 |
| ... | | |
| 6, 7, 8, 9, 10 | 0 | 1, 2, 3, 4, 5 |
| 6, 7, 8, 9, 10 | 1 | 6, 7, 8, 9, 10 |
| 6, 7, 8, 9, 10 | 2 | 11, 12, 13, 14, 15 |
| ... | | |
| 1, 2, 3, 4, 5 | 120 | 596, 596, 598, 599, 600 |

| SCAN NUMBER | LED ROW | VIEWING SURFACE ROW |
|---|---|---|
| 1, 2, 3, ..., 10 | 1 | 1, 2, 3, ..., 10 |
| 1, 2, 3, ..., 10 | 2 | 11, 12, 13, ..., 20 |
| ... | | |
| 1, 2, 3, ..., 10 | 120 | 1191, 1192, 1193, ..., 1200 |

LIGHT EMITTING DEVICE PROJECTION METHODS AND SYSTEMS

The present application is a continuation-in-part of U.S. patent application Ser. No. 10/419,321, filed Apr. 19, 2003, entitled "Projector Having Scanning Optics", inventors Winthrop D. Childers, et. al. The present application is also a continuation-in-part of U.S. patent application Ser. No. 10/349,047, filed Jan. 21, 2003, entitled "Projector Having Alignment Optics and Electronics", inventor Winthrop D. Childers, which is a continuation-in-part of U.S. patent application Ser. No. 10/309,425, filed Dec. 3, 2002, entitled "Projector Having Alignment Optics and Electronics", inventor Winthrop D. Childers, and a continuation-in-part application of U.S. patent application Ser. No. 10/138,765, entitled "Projector Having Scanning Optics", by Winthrop Childers, filed on May 3, 2002.

BACKGROUND OF THE INVENTION

Conventional digital projectors are generally devices that integrate light sources, light modulators, optics systems, electronics, and/or displays for projecting images, using data signals from computers or video devices, onto walls or screens, for large-image viewing. During a frame (whether a standard NTSC frame lasting approximately $\frac{1}{60}^{th}$ of a second or a frame of some other duration), light emitted by the light source is modulated and then projected onto the viewing surface at designated pixel locations to form the image being displayed. Conventional projectors have limitations depending upon their architecture and implementation.

For example some systems, such as the Texas Instruments DLP based systems, utilize a color wheel in series with a micro-mirror light modulator. Issues that may arise with the DLP system include sequential color artifacts, cost of the micro-mirror, and lost light due to the color wheel.

Other systems such as LCD projectors split the light using dichroics into primary colors, and modulate each color with an LCD panel before recombining the light. While these systems are often more light-efficient than color wheels, there is still light lost due to polarization. Also, the optics tend to be complicated and expensive.

SUMMARY OF THE INVENTION

Some embodiments of the invention provide a projection system including a frame buffer block, a reordering block, a redundancy separation block, an array of light emitting devices, and optics. The frame buffer block stores pixel data specifying desired pixel values for pixel locations in an image. The reordering block reads selected pixel data from the frame buffer block and assigns the selected pixel data to corresponding light emitting devices in an array of light emitting devices; the pixel data is selected according to a mapping that maps the array of light emitting devices to target pixel locations toward which the light emitting devices will be directed, such that each pixel location is a light emitting device target at least twice per frame and each light emitting device is directed toward at least two pixel locations per frame. The redundancy separation block receives from the reordering block pixel data and corresponding light emitting device assignments specifying the total expected emitted light for each assigned light emitting device during a frame, and the redundancy separation block allocates those totals among the subframes of the frame. The array of light emitting devices is directed according to the signals provided by the frame buffer block, the reordering block, and the redundancy separation block. Optics guide light from the light emitting devices toward the pixel locations.

Other aspects of the present invention will become more fully apparent through the following description.

BRIEF DESCRIPTION OF THE DRAWINGS

To illustrate the manner in which the advantages and features of the invention are obtained, a more particular description of the invention will be given with reference to the attached drawings. These drawings only illustrate selected aspects of the invention and thus do not fully determine the invention's scope.

DETAILED DESCRIPTION

Figure 1:
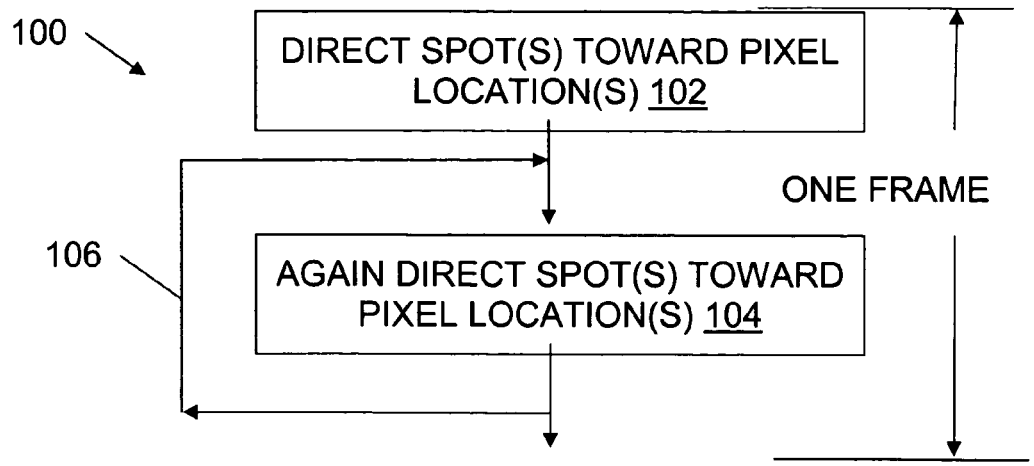
FIG. 1 is a flow chart of a projection method according to at least one embodiment of the present invention.

Reference will now be made to exemplary embodiments such as those illustrated in the drawings, and specific language will be used herein to describe the same. But alterations and further modifications of the inventive features illustrated herein, and additional applications of the principles of the inventions as illustrated herein, which would occur to one skilled in the relevant art(s) and having possession of this disclosure, should be considered within the scope of the invention.

In describing the invention, the meaning of important terms is clarified, so the claims must be read with careful attention to these clarifications. Specific examples are given to illustrate aspects of the invention, but those of skill in the relevant art(s) will understand that other examples may also fall within the meaning of the terms used, and within the scope of one or more claims. Words used herein do not necessarily have the same meaning they have in everyday usage. Terms may be defined, either explicitly or implicitly, here in the Detailed Description and/or elsewhere in the application file. It is not necessary for every means or aspect identified in a given definition or example to be present or to be utilized in every embodiment of the invention.

Projection Methods

FIG. 1 is a flow chart of projection methods 100 according to the present invention. The invention provides projection methods for directing a collection of individual light generators or individually addressable light sources or other "light emitting devices" toward pixel locations during a frame to make an image having pixels that are illuminated at least in part by light emitted from the directed light emitting devices. The light emitting devices 306 (FIG. 3) may be individually addressable devices such as light emitting diodes or lasers or other solid state devices that can cast small spots of light upon a viewing screen. A light emitting diode is a particular example of an individually controllable light emitting device. Before reaching the screen, light from a particular light emitting device will generally tend to pass through various optics before reaching the viewing surface. In the present invention, this includes scanning optics for causing the light to scan across the screen to address various pixel locations on the screen.

The mere fact that a particular light emitting device in a projection system does not operate according to the described invention would not place the projection system and/or its operation outside the claimed invention. For instance, infringement is not avoided by simply adding one undirected LED to an array of LEDs that is otherwise directed as described herein. The invention is embodied if there is any collection of LEDs and/or other light emitting devices within the system or method in question that direct light as claimed and if the other claim limitations are met.

Likewise, the frame may be an NTSC frame lasting approximately $1/60^{th}$ of a second, or it may have some other frame duration. Pixel locations 804 (FIG. 8) are locations on a display 802 (FIG. 8) screen, and/or another viewing surface such as a wall.

The illustrated method 100 includes directing steps 102, 104. During a subframe of the frame, step 102 directs at least one of the light emitting devices toward a pixel location. During another subframe of the same frame, step 104 directs at least one of the light emitting devices toward the same pixel location, thereby making that pixel location a light emitting device target at least twice during that frame. As indicated by flow chart path 106, step 104 may be repeated in some methods of the invention.

When we say that a light emitting device is directed toward the same pixel location on a viewing surface, it does not necessarily mean the exact same location on the viewing surface, at least not in every embodiment. The light emitting device may be directed to a location that overlaps with the pixel or is in close proximity (within a distance of one pixel) to the pixel. Another way to say this is that the location is within a sub-pixel vicinity of the pixel. In practical systems, alignment of light emitting devices from one pass of the scanning optics (to be discussed shortly) to the next tends to be imperfect. Also, there may be reason to shift data to enhance resolution from one frame to the next or one subframe to the next. For instance, each subframe may have SVGA resolution (800×600) but four subframes in sequence may define UXGA resolution (1600×1200) with such shifting.

When a light emitting device addresses a pixel location, it is not centered at a particular point but actually sweeps out a very small area, since the beam hitting the viewing surface is constantly moving. We can refer to the centroid (like a center of mass calculation on the energy dose) of the spot formed. A spot location in a sub-pixel vicinity of a pixel location would be a spot that has a centroid that is less than the center to center distance between two pixels from the targeted pixel.

When we refer to a subframe, we are referring to a portion of the frame period during which a collection of light emitting devices overwrites at least a portion of an illuminated viewing surface with at least one color. Subframes are generally sequential—a frame starts with subframe 1, subframe 2, etc., with minimal temporal overlap between subframes. During a particular subframe, all the primary colors are typically utilized (defining the difference between a subframe and a "color subframe"). Typically red, green, and blue spots are generated simultaneously on the illuminated viewing surface.

The "illuminated viewing surface" refers to the actual area of the viewing surface that the projector system illuminates. This is, of course, affected by the zoom, the distance between the projector and the viewing surface, and the format of the incoming video signal. In the special case of an RPTV (rear projection television) the zoom and distance are fixed.

A light emitting device can be "directed" toward a pixel location regardless of whether the light emitting device emits light. That is, in determining whether a given light emitting device is directed toward a given location one is not limited to observing whether light from the light emitting device actually reaches the location. For instance, a weakened or burned-out LED may be directed toward a specified pixel location even if no light from the LED reaches the targeted location.

When we say that a light emitting device is directed toward a given pixel location, it means that the intervening optics is configured to cause light from that light emitting device to form a spot on the viewing surface at the particular pixel location in the event that the light emitting device is outputting light. As indicated before, of course, the "same pixel location" is inexact and could be up to one pixel away from the same location. Pixel locations on the viewing surface or screen are locations defined by the projection system and each is generally addressed by forming spots from the light emitting devices. Addressing a pixel location with a light emitting device generally means the same thing as directing the light emitting device to the pixel location and would mean forming a spot at the pixel location provided that the light emitting device is in an ON state and/or is outputting light, and the optics are working.

Figure 2:
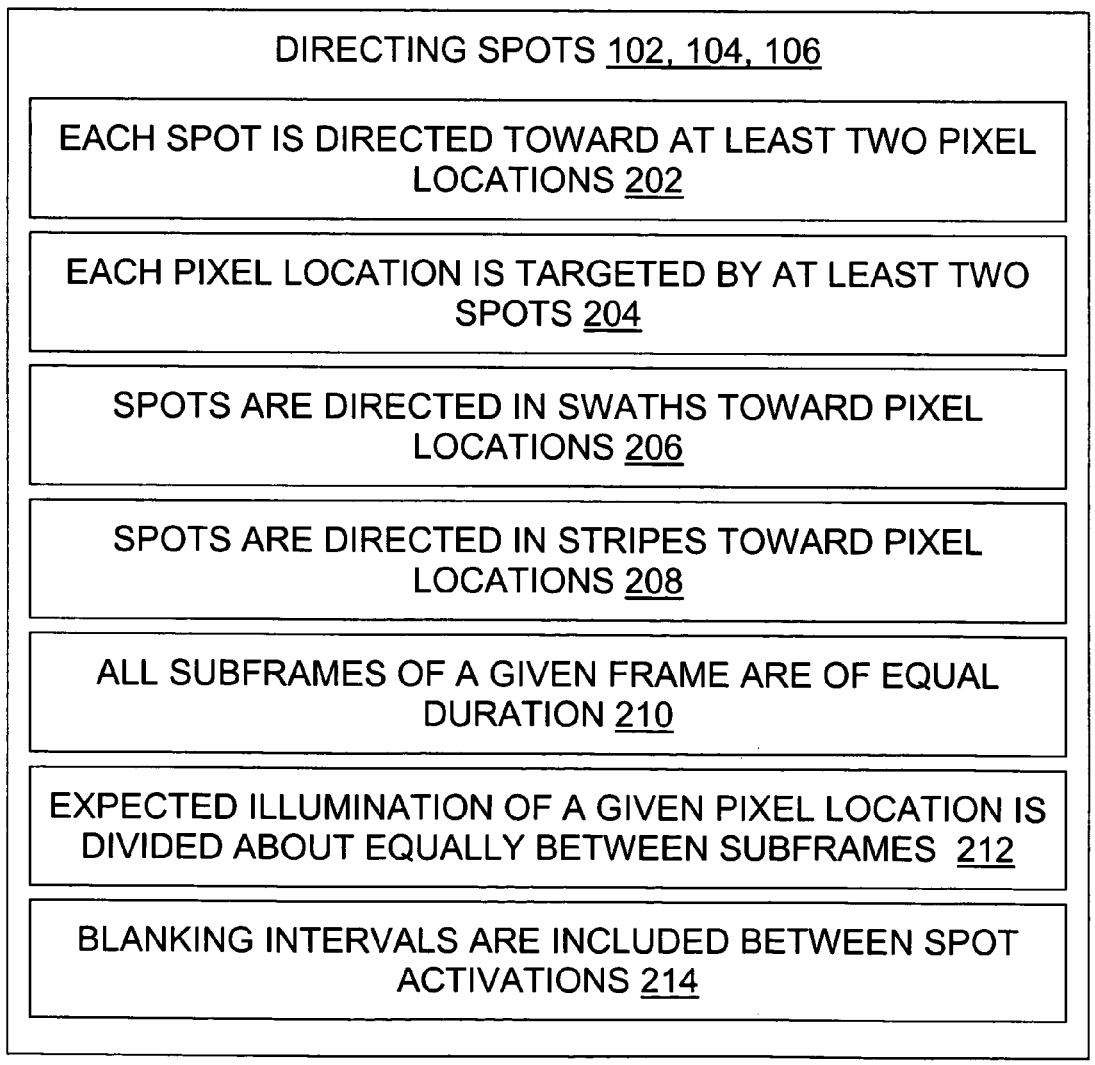
FIG. 2 is a flow chart further illustrating some steps that may be used by the method(s) shown in FIG. 1.

One approach to understanding the invention is to consider mappings from the light emitting devices to the pixel locations. Mappings are illustrated in FIGS. 8 to 13 and in FIG. 2, for example. In some embodiments, each light emitting device in the collection of light emitting devices with which the invention is concerned are directed during the same frame toward at least two different pixel locations, as noted in step 202 in FIG. 2. That is, a given light emitting device is mapped to at least two pixel locations per frame. In some embodiments, each pixel location with which the invention is concerned is the target during one frame of at least two different light emitting devices of a given color, as noted in step 204. That is, at least two light emitting devices of the color in question are mapped to a given pixel location per frame. Such one-to-many, many-to-one, and many-to-many mappings of light emitting devices to pixel locations may be done in a serial manner across subframes and/or in a parallel manner during a given subframe in various embodiments of the invention.

As discussed and illustrated at least in connection with FIGS. 8 through 13, mappings may also preserve adjacency or not. In some embodiments, adjacent light emitting devices are mapped 206 in swaths to adjacent pixel locations, whereas in some other embodiments adjacent light emitting devices are mapped 208 in stripes to nonadjacent pixel locations. Stripes and swaths may be mixed in some embodiments. Stripes and swaths may be horizontal, vertical, or diagonal, and they may be overlapping or non-overlapping. Mappings that do not preserve adjacency may do so with patterns other than regular horizontal stripes, such as by spreading in both vertical and horizontal axes instead of spreading only in parallel lines.

Thus, in some embodiments pixel locations are light emitting device targets more than twice during the frame. In some embodiments at least two different light emitting devices of a given color are directed toward the same pixel location during the frame. In some embodiments light emitting devices are directed toward pixel locations in swaths such that adjacent light emitting devices are directed at adjacent pixel locations during a subframe. In some embodiments light emitting devices are directed toward pixel locations in stripes such that adjacent light emitting devices are directed at nonadjacent pixel locations during a subframe.

In some embodiments 210 the subframes are of equal duration; in others they are not. Unless otherwise indicated, however, substantially equal length subframes are assumed in the specific examples provided herein. Subframes of a frame have substantially equal length if the longest subframe is no more than 1.5 times the length of the shortest subframe.

In some embodiments the total illumination reaching a pixel location from the light emitting devices during the frame is divided 212 substantially equally between all subframes of the frame. For instance, if there are two subframes and the total energy or other illumination measure reaching the pixel location is denoted by x, and if t denotes a tolerance, then each subframe receives a value that lies within x/2 plus or minus t as its portion of the total illumination. That is, the illumination is divided about equally between the subframes. Suitable tolerances t can be determined by those of skill in the art; suggested starting values are to set t equal to 15%, 10%, or 5% of the value x/n, where x is the total illumination intended to reach a pixel location during the frame, and n is the number of equal-length subframes of the frame. An approach that divides illumination about equally between subframes may also be described as spreading the most significant bits (MSBs) of the illumination over multiple light emitting device passes. An alternative is to weight one or more subframes more heavily than the other subframe(s) so that one or more subframes provides (or attempts to provide—light emitting devices may be weak and/or missing) substantially more illumination than the other subframe(s) in the given frame.

In some embodiments, blanking intervals are included 214 between light emitting device activations. That is, the light emitting devices do not continuously emit light even if they are directed at fully illuminated pixels. This is further illustrated and discussed in connection with FIGS. 9 to 11.

The steps and other characteristics described herein may be combined in various ways to form embodiments of the invention. In methods of the invention, steps may be omitted, repeated, renamed, supplemented, performed in serial or parallel, and/or grouped differently, except as required by the claims and to provide an operable embodiment. In particular, not every step illustrated in FIG. 2 need be performed in a given method according to the invention.

By way of example, one projection method according to the invention includes the steps of: during a subframe of a frame directing 102 a light emitting device toward a pixel location; and during another subframe of the same frame directing 104 a light emitting device toward the same pixel location, thereby making that pixel location a light emitting device target at least twice during that frame, wherein each light emitting device in a collection of light emitting devices is directed 202 during the same frame toward at least two different pixel locations, regardless of whether the light emitting device emits light, and light emitting devices are directed 206 toward pixel locations in swaths such that adjacent light emitting devices are directed at adjacent pixel locations during a subframe. In one such embodiment, light emitting devices are directed toward pixel locations during each of at least four subframes of the frame, so path 106 is followed at least twice. In one, each pixel location is 204 a target of at least two different light emitting devices of a given color during the frame. In one, the swaths are diagonal such that a row of light emitting devices is directed at a selection of pixel rows which varies linearly during a subframe.

As another example, one projection method according to the invention includes the steps of: during a subframe of a frame directing 102 a light emitting device toward a pixel location; and during another subframe of the same frame directing 104 a light emitting device toward the same pixel location, thereby making 204 that pixel location a light emitting device target at least twice during that frame, wherein each light emitting device in a collection of light emitting devices is directed 202 during the same frame toward at least two different pixel locations, regardless of whether the light emitting device emits light, and light emitting devices are directed 208 toward pixel locations in stripes such that adjacent light emitting devices are directed at nonadjacent pixel locations during a subframe. In one such embodiment, light emitting devices are directed 102, 104 toward pixel locations during each of at least ten subframes of the frame, so path 106 is followed at least eight times.

Even though particular embodiments and uses of the present invention are expressly illustrated and described individually herein, it will be appreciated that discussion of one type of embodiment and its uses also generally extends to other embodiment types and their uses. For instance, the foregoing description of the invention's methods also helps describe the structures and operation of the invention's systems and system components, and vice versa.

Projection System Components and Systems

Figure 3:
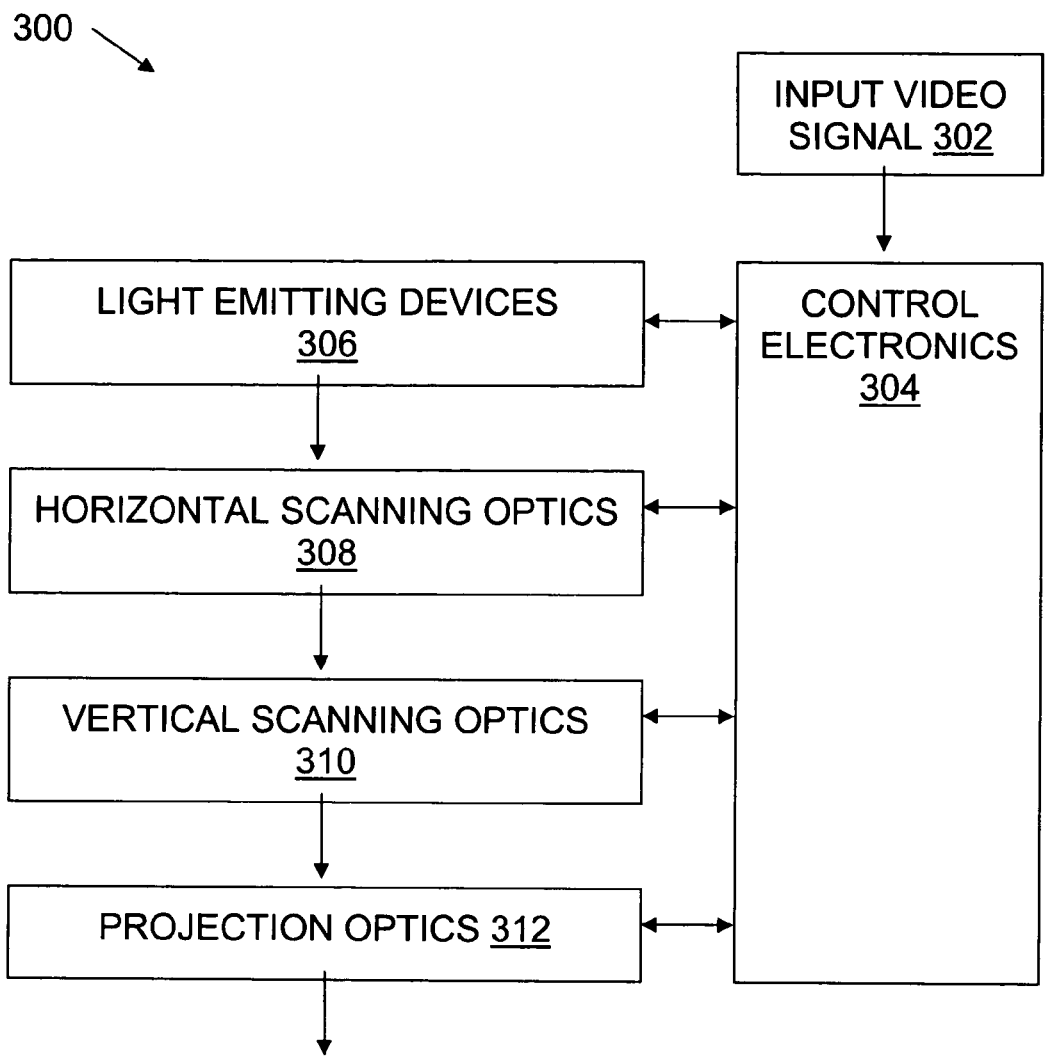
FIG. 3 is a diagram illustrating a projection system according to at least one embodiment of the present invention.

FIG. 3 is a diagram illustrating a projection system 300 of the present invention. In one embodiment, an RGB input video signal 302 includes color frames, such as frames at the rate of approximately 60 frames per second. The invention assists in generating an image from a given frame of data having a given resolution. The image may be generated from color maps in which each color map has all pixels addressed with a given color, such as red, green and blue. By dividing the color maps into temporally sequential subframes for a given primary color, the invention may reduce errors or visual artifacts from missing or weak LEDs, for instance. Flicker may also be reduced by having multiple subframes.

System control electronics 304 may manipulate and/or build on the input video signal to implement the inventive methods. The control electronics 304 may be implemented, manufactured, and/or sold in components. To the extent that hardware, software, and firmware implementations are deemed partially or fully interchangeable at the time in question by one of skill in the art, they may be utilized in embodying the invention even though the specific examples discussed here are implemented differently.

Figure 6:
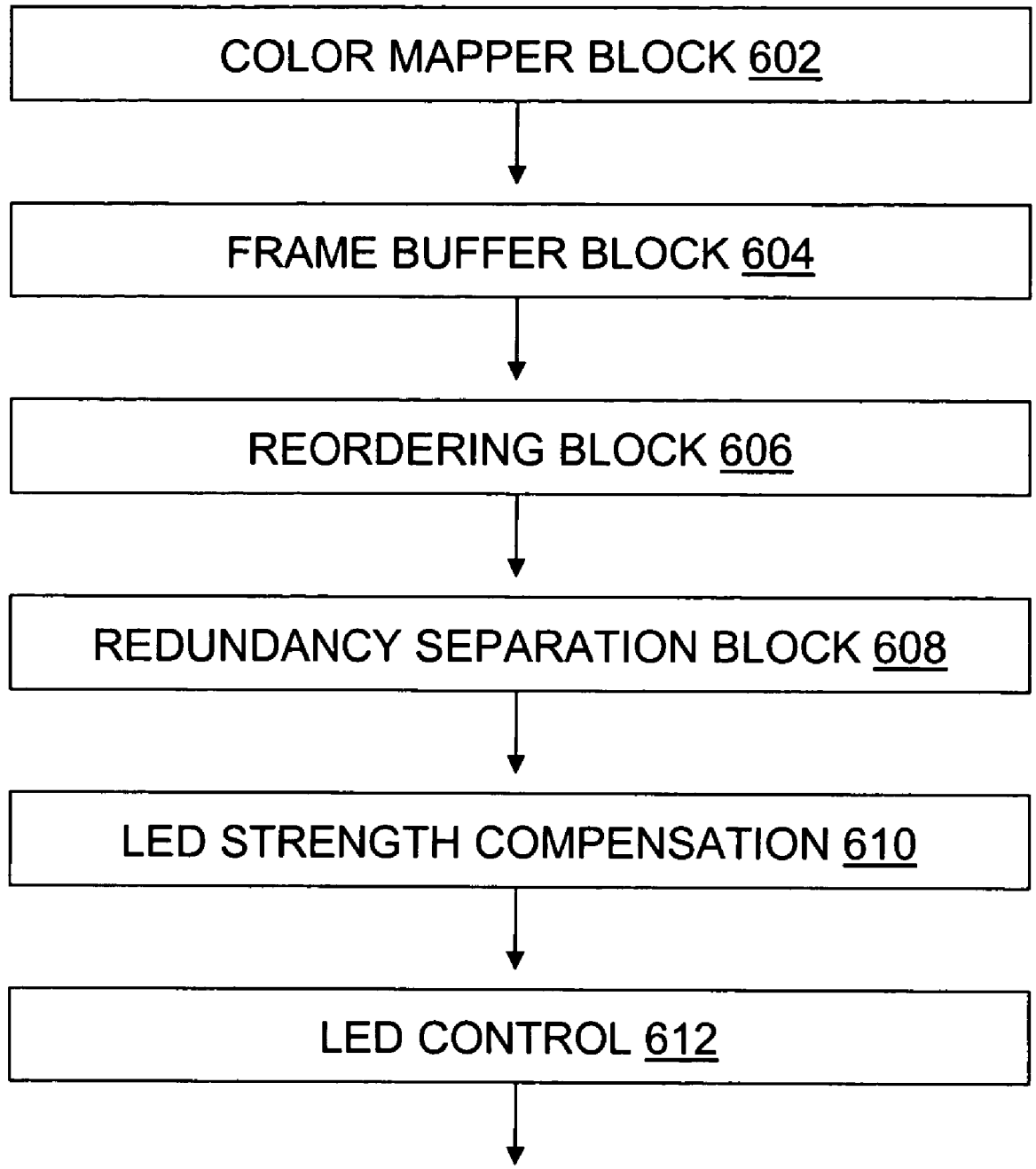
FIG. 6 is a diagram illustrating projection system component blocks according to at least one embodiment of the present invention.

In one embodiment, a color mapper block 602 (FIG. 6) receives NTSC RGB information 302 and converts that information into the light emitting device RGB color space. The light emitting device RGB color space primaries depend on the wavelengths of the LEDs or other light emitting devices 306.

In one embodiment, a projection system component within the control electronics includes a frame buffer block 604 (FIG. 6) which stores pixel data specifying desired pixel values for pixel locations in an image; and a reordering block 606 which reads selected pixel data from the frame buffer block and assigns the selected pixel data to corresponding light emitting devices in an array of light emitting devices. The pixel data may be selected according to a mapping that maps the array of light emitting devices to target pixel locations toward which the light emitting devices will be directed. For instance, the mapping may be such that each pixel location is a target of at least two light emitting devices in each frame and each light emitting device is directed toward at least two pixel locations in each frame.

Figure 7:
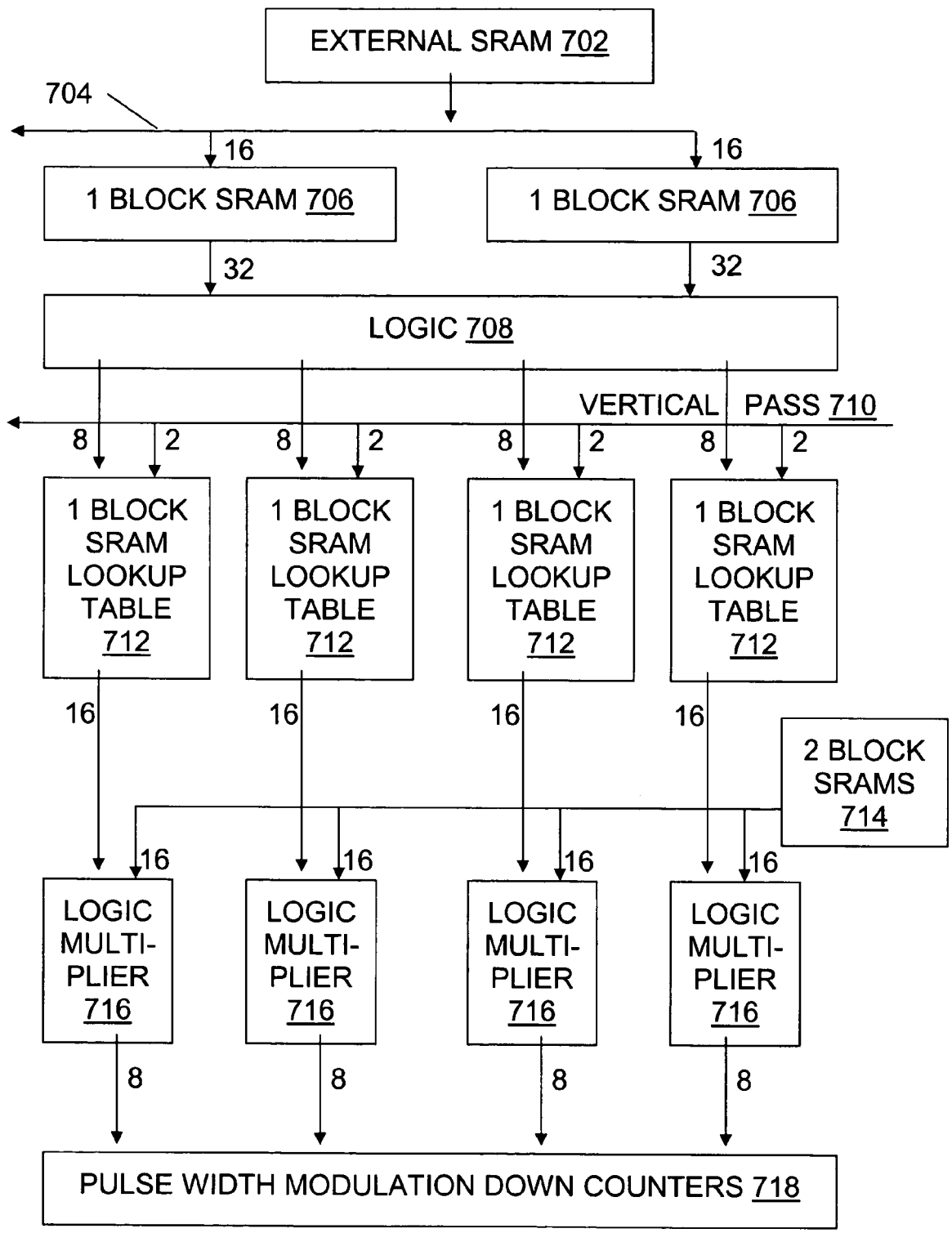
FIG. 7 is a diagram illustrating projection system component blocks in one color's data path, which further illustrates an embodiment of the system(s) shown in FIG. 6.

In one embodiment, the frame buffer block stores at least two frames of pixel data. Data is read from the frame buffer repeatedly to support multiple subframes, that is, multiple passes across a pixel location. One implementation of the frame buffer block 604 includes an external SRAM 702 (FIG. 7). This particular implementation supports 800×600 pixels/frame×4 bytes/pixel×2 frames=3.67 Mbytes of storage. R, G, B values are stored in adjacent bytes, 32 bits/pixel. Other implementations of the frame buffer are also possible within the scope of the invention.

In one embodiment, the reordering block grabs what is needed from the frame buffer in order to optically address what is required for light emitting device sequencing on an array of light emitting devices, such as a 4×120 array of LEDs. One implementation of the reordering block 606 includes two internal SRAMs 706 and logic circuitry 708 (FIG. 7). In this particular implementation each block SRAM 706 supports 16 bits/color/write×2 writes/burst width×120 high×4 swing=1920 bytes of storage. The logic 708 includes thirty-two 8:1 multiplexers, so that from 8 bytes it selects 4 bytes for 4 adjacent LEDs. Other implementations of the reordering block are also possible within the scope of the invention.

In some embodiments, a projection system component includes a redundancy separation block 608 which receives from the reordering block pixel data and corresponding light emitting device assignments specifying the total expected emitted light for each assigned light emitting device during a frame. The redundancy separation block allocates those light emitting device totals among the subframes of the frame. For instance, in some embodiments the redundancy separation block allocates the energy contribution for the LEDs that address a pixel during a particular frame such that each of four subframes receives approximately equal energy; some may receive slightly more or less to correspond with the least significant bits of the energy.

The redundancy separation block may use table lookup to allocate intensity for multiple light emitting devices and passes for each pixel location. One implementation of the redundancy separation block 608 includes four lookup tables in internal SRAMs 712 (FIG. 7). In this particular implementation each SRAM 712 supports 2 Kbytes of storage. Other implementations of the redundancy separation block are also possible within the scope of the invention.

In some embodiments the projection system 300 includes light emitting device strength compensation 610 circuitry and light emitting device control 612 circuitry. One implementation includes 2 block SRAMs 714 (123×4 LEDs * 16 bits/LED=984 bytes), four multipliers 716 and a set of pulse width modulation down counters 718, as shown in FIG. 7. In this particular implementation, the multipliers are implemented with logic embedded as shown, and there are 492 down counters to support pulse width modulation of each LED, in a configuration 4 LEDs wide and 123 LEDs high. Other implementations of the circuits 610, 612 are also possible within the scope of the invention.

Note that FIG. 7 details a single color's data path, e.g., the red light emitting device data path, in a system component having three colors; the green data path and the blue data path are generally duplicates of the illustrated red data path. A vertical pass signal line 710 connects to all three data paths, as does signal line 704 from the frame buffer SRAM 702. The invention may also be used in monochrome systems, and in systems using color spaces other than RGB.

As indicated, in some embodiments the invention provides a projection system component wherein the allocation of a light emitting device total is partly determined by pulse width modulation of the light emitting device. In some embodiments the allocation of a light emitting device total is partly determined by intensity of the light emitting device. In some, the allocation of light emitting device totals specifies for each light emitting device that the energy emitted from that light emitting device will be approximately equal during each subframe, whereas in others some subframes are allocated substantially more energy than other subframes.

Different embodiments may omit, repeat, regroup, supplement, or rearrange the blocks and components illustrated, provided the system overall is operable and conforms to at least one claim. As an example, the invention provides a projection system 300 like that shown in FIG. 4 including: control electronics 304 having a frame buffer block which stores pixel data specifying desired pixel values for pixel locations in an image; a reordering block which reads selected pixel data from the frame buffer block and assigns the selected pixel data to corresponding light emitting devices in an array of light emitting devices, the pixel data being selected according to a mapping that maps the array of light emitting devices to target pixel locations toward which the light emitting devices will be directed, such that each pixel location is a light emitting device target at least twice per frame and each light emitting device is directed toward at least two pixel locations per frame; and a redundancy separation block which receives from the reordering block pixel data and corresponding light emitting device assignments specifying the total expected emitted light for each assigned light emitting device during a frame, and the redundancy separation block allocates those totals among the subframes of the frame.

Figure 4:
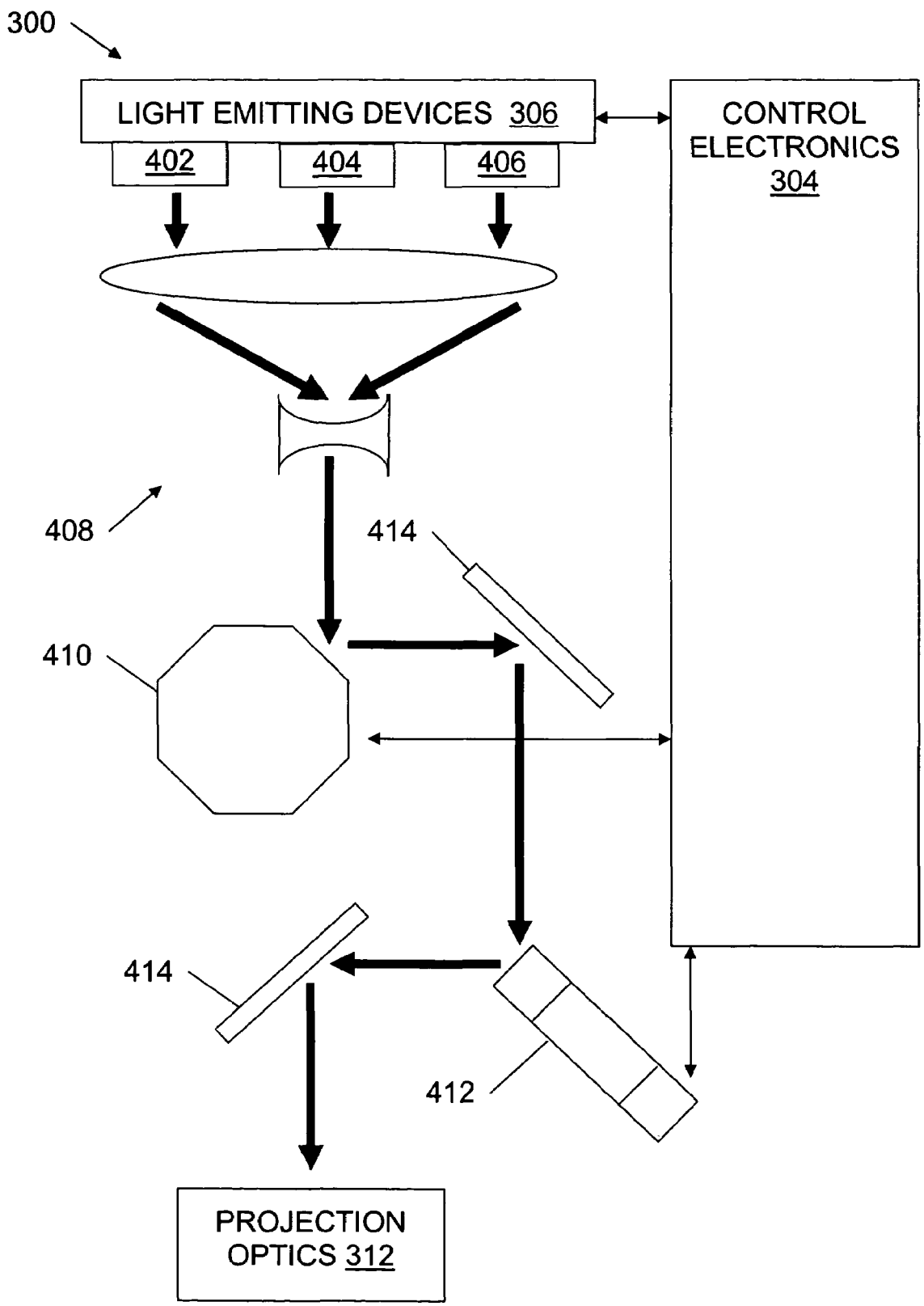
FIG. 4 is a diagram illustrating a projection system, which further illustrates an embodiment of the system(s) shown in FIG. 3.

The system 300 further includes an array of light emitting devices 306 directed according to the signals provided by the frame buffer block, the reordering block, and the redundancy separation block; in the embodiment illustrated in FIG. 4, these include red light emitting devices 402, green light emitting devices 404, and blue light emitting devices 406. Suitable light emitting devices include light emitting diodes (LEDs), semiconductor lasers, and/or vertical cavity surface emitting lasers, for example.

If the projection system's array of light emitting devices includes red light emitting devices, green light emitting devices, and blue light emitting devices which define an RGB light emitting device color space, then the system's colormapper block 602 converts input data (such as RGB data or YCbCr data) into the RGB light emitting device color space from another color space. For instance, in some embodiments the colormapper block converts NTSC RGB data into the RGB light emitting device color space. In other embodiments, the system utilizes more than three color light emitting devices such as RGBCY (red, green blue, cyan, and yellow) and would have a colormapper adapted for this color space.

In some embodiments, the area of pixel locations (possibly but not necessarily every pixel location with shifting between projected spots an option between subframes) are addressed with all primary colors during a subframe. For a monochrome projector there would be only one primary. Some projectors use RGB, but others may use four, five, or more primaries to enhance the color space.

Some embodiments of the system 300 include optics for guiding light from the light emitting devices toward the pixel locations. Light from LEDs is typically collimated and concentrated so it can be passed through scanning optics that cause the resultant light emitting device outputs to scan on two axes through projection optics and onto a viewing screen.

In some embodiments the optics include concentrator optics 408, horizontal scanning optics 308, vertical scanning optics 310, and projection optics 312. Scanning optics may be implemented using rotating polygonal mirrors, such as polygonal mirrors 410 and 412 in FIG. 4. The optics may include one rotating polygonal mirror for vertical control of light emitted from light emitting devices and another rotating polygonal mirror for horizontal control of light emitted from light emitting devices.

In an alternative embodiment, the vertical (or horizontal) scanning can be induced by a tilting mirror such a mirror that is programmably tilted using a galvanometer. In some embodiments the light emitting devices are turned off during blanking periods that correspond to vertices of the rotating polygonal mirror(s), thereby allowing for galvanometer mirror movement and settling. Other implementations of system optics may also be used, such as other types of optics for inducing the vertical and/or the horizontal scanning.

The projection system may further include a screen or other display 802 (FIG. 8) having pixel locations 804 toward which the light emitting devices are directed.

Figure 5:
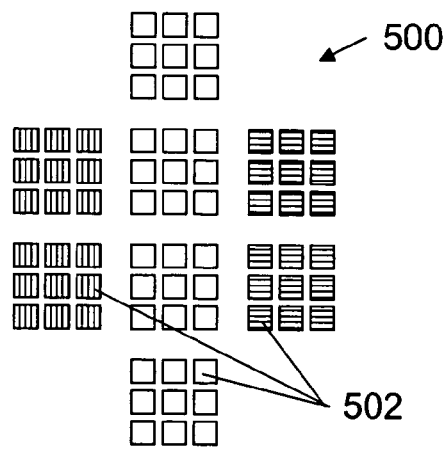
FIG. 5 is a diagram illustrating light emitting devices in a superpixel in a projection system according to an embodiment of the present invention.

Some embodiments employ one or more superpixels such as the one illustrated in FIG. 5. A superpixel 500 array of light signals is generated and scanned across the viewing surface 802. FIG. 5 depicts red, green, and blue light emitting devices. Each colored light emitting device 502 is individually addressable by the control electronics 304. The light emitting devices directed toward a pixel location are turned on and off to help determine the color intensity at that pixel location. The superpixel may be concentrated in a small area such as area 806 shown in FIG. 8, or it may be widely dispersed across the screen 802.

ADDITIONAL EXAMPLES

FIGS. 8 through 13 illustrate mappings according to the invention between light emitting devices and the pixel locations targeted by the light emitting devices. However, embodiments of the invention are not limited to these specific examples, and a particular embodiment does not necessarily conform to any, to some, or to all of these examples.

Figure 8:
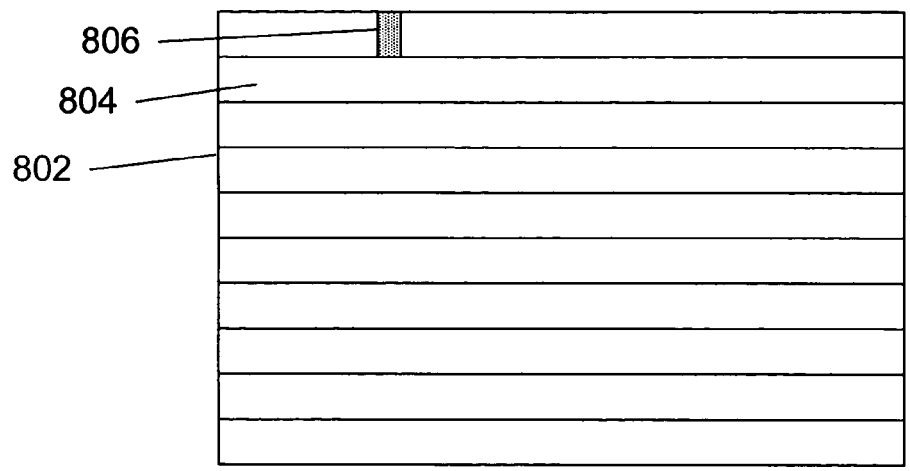
FIG. 8 is a diagram illustrating target pixel locations in a display according to an embodiment of the present invention.

One of the embodiments illustrated by FIG. 8 has the following detailed characteristics: NTSC frame rate of approximately 60 frames per second, which is about 16.67 milliseconds per frame; screen 802 resolution of SVGA or 800 horizontal by 600 vertical pixel locations 804 in an array; LEDs as light emitting devices with 480 LEDs each for R, G, and B, arranged in an 8 by 60 array for each color, in a 24 by 60 array overall for RGB; rotating mirrors for horizontal and vertical control, with ten facets per mirror, providing 72 degrees of displacement; in a single frame 20 horizontal passes are made, covering the screen twice; the horizontal mirror spins at 7200 RPM (120 frames per second), and the vertical mirror spins at 720 RPM. Thus, in this embodiment during each color frame there are two facets per vertical mirror 412 and 20 facets (two revolutions) per horizontal mirror 410, as indicated in FIG. 8 by the ten horizontal nonoverlapping swaths. Each subframe is defined by the complete coverage of the screen (viewing area) so there are two subframes per frame in this example. Note that in this example the swaths in FIG. 8 are shown as horizontal for simplicity but they would actually slope in a manner like that depicted in FIG. 10 since a vertical polygon (faceted) mirror is used. The swaths would be horizontal in the event that a galvanometer mirror was selected for the vertical movement instead of the vertical polygon mirror.

FIG. 8 also shows a scanning superpixel array 806, which in this embodiment is targeted by a set of light emitting devices 60 light emitting devices high and 8 light emitting devices wide for each color. Accordingly, for each pass, each pixel location is addressed by 8 light emitting devices per primary color.

In this embodiment each pixel is targeted 16 times for each frame. For 24-bit color (8 bits each for R, G, and B) there are 256 color levels, so pulse width modulation and/or pixel intensity control are used to generate about 16 additional color levels to provide full 8-bit color per primary color.

In this embodiment each light emitting device should generate 800 pixels during a single pass, that is, during a single facet of the horizontal scan polygonal mirror. A pass occurs in $1/2400^{th}$ of a second, which is about 0.833 milliseconds. Thus, the rate of generation of pixel illuminations for a single light emitting device is 60 Hz×20×800=0.96 MHz.

Each pixel is generated in about one microsecond. Each should generate 16 gray levels, making the least significant bit time about 65 nanoseconds if pulse width modulation is used. Otherwise, the intensity of the light emitting device or a combination of pulse width modulation and intensity variation can be used to achieve pixel generation at a high rate. Pixel illumination least significant bits could also be generated by spatial dithering and/or temporal dithering. This could increase the least significant bit time by a factor of about 2 to about 16 depending on what dithering is done.

In this embodiment the most significant bits of pixel illumination are split—between different subframes and between different light emitting devices targeting a given pixel location—substantially equally 212 as much as possible. This helps reduce the effect of missing LEDs and helps reduce flicker.

Figure 10:
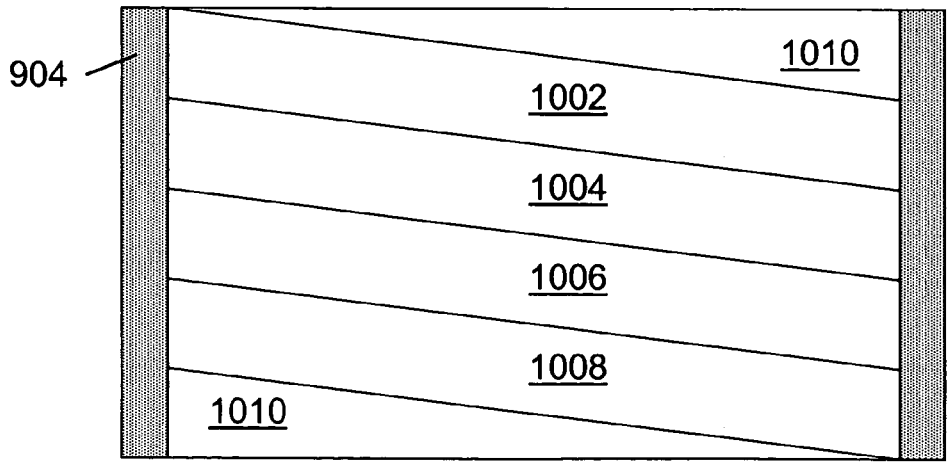
FIG. 10 is a diagram illustrating a display with details of a mapping that maps an array of light emitting devices to target pixel locations in the display according to an embodiment of the present invention such as one for an SVGA system with four subframes and diagonal swaths.

Another embodiment similar to that illustrated by FIG. 8 (except that there would be only 5 scan lines and they would slant—making FIG. 10 perhaps a closer representation) has the following detailed characteristics: NTSC frame rate of approximately 60 Hz; screen resolution of SVGA or 800× 600; light emitting device array 120 tall by 4 wide; two 10-facet mirrors; in a single frame 20 horizontal passes cover the screen four times, using 20 horizontal facets and 4 vertical facets per frame; horizontal mirror at 7200 RPM, vertical mirror at 1440 RPM. If we define a subframe as a vertical facet, in this embodiment there are four subframes per frame. During a given subframe, each pixel location is targeted by four light emitting devices. Thus, the system generates 16 levels (4-bits) of color due to the redundancy of coverage. The remaining four bits can be generated using pulse width modulation and/or intensity variation and/or dithering.

Some characteristics of these and other embodiments include the following. Scanning primary color (such as RGB) light emitting devices generate an image. During a single frame, the same pixel location on the screen is addressed multiple times for a given primary color, providing redundant coverage. Redundant coverage may be provided at least in part by having multiple light emitting devices simultaneously present for a given line to be scanned. Redundant coverage may be provided at least in part by having the scanning optics provide multiple passes over the same viewing region; this can be done using more than one facet of the vertical mirror during a frame, per the definition of subframes. Most significant bits can be split between subframes (different passes) to help reduce flicker. Redundant coverage may be provided by a combination of subframes and redundant light emitting devices. Color levels may be generated by a combination of integrated energy applied when a pixel is generated and multi-pass pixel generation. In some embodiments, the integrated energy applied is partly determined by pulse width modulation. In some embodiments, the integrated energy applied is partly determined by the intensity of the light source.

Figure 9:
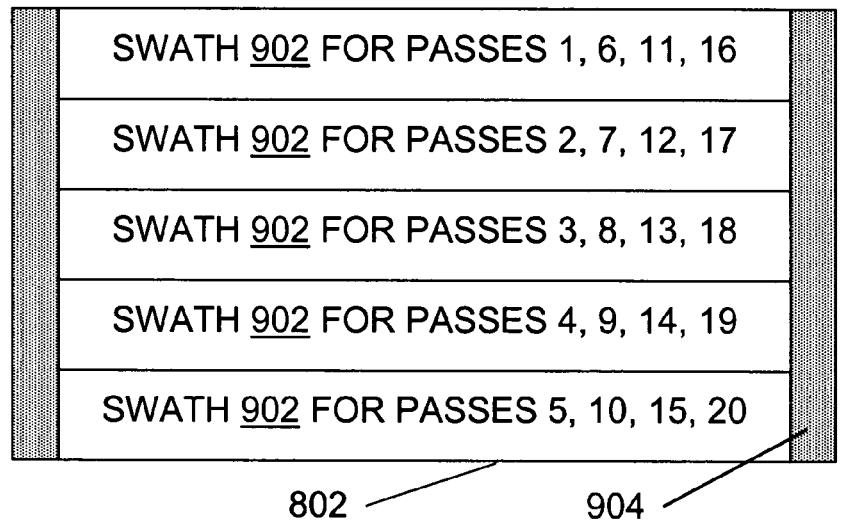
FIG. 9 is a diagram illustrating a display with details of a mapping that maps an array of light emitting devices to target pixel locations in the display according to an embodiment of the present invention such as one for an SVGA system with four subframes and horizontal swaths.

FIG. 9 is a diagram illustrating a display with details of a mapping that maps an array of light emitting devices to target pixel locations in the display according to an embodiment of the present invention such as one for an SVGA system with four subframes and horizontal swaths. In this embodiment LED light emitting devices are arranged in an array that is 123 LEDs tall (aligned with the vertical axis of the display) by 4 LEDs wide (aligned with the horizontal axis). Rows of LEDs are numbered for reference from row 1 at the top consecutively through row 123 at the bottom. Viewing area rows are numbered for reference from 1 at the top through row 600 at the bottom.

Vertical and horizontal scanning optics are used in this embodiment. The vertical mirror is a galvanometer mirror that covers the viewing area in five horizontal swaths 902 and covers the entire area four times per frame. Thus, there are 20 horizontal swaths per frame. The vertical mirror changes position at the frequency of 60×20=1200 Hz. The scanning pattern is to advance one swath at a time down the viewing area and then start again at the top. The horizontal mirror is a ten-facet mirror spinning at 1200 Hz/10=120 Hz=7200 RPM. The galvanometer mirror takes a determinable amount of time to stabilize between changes in position. Accordingly, a blanking period is introduced 214 during which the light emitting devices are turned off. This blanking period corresponds to regions 904 at each end of the viewing area, and it is synchronized with when the light beam(s) from the light emitting devices would hit polygonal mirror vertices.

During a given frame, the viewing area is targeted by light emitting devices four times. Each such complete coverage by the light emitting device array occurs in a subframe, so there are four subframes per frame in this example. The first subframe includes passes (horizontal scans) one through five and utilizes light emitting device rows 1–120 while light emitting device rows 121–123 are not used during the first subframe. During pass one, light emitting device rows 1–120 are aligned with viewing area rows 1–120, respectively. On pass 2, light emitting device rows 1–120 are aligned with viewing area rows 121–240. On pass 3, light emitting device rows 1–120 are aligned with viewing area rows 241–360. On pass four, rows 1–120 are aligned with viewing area rows 361–480. On pass 5, light emitting device rows 1–120 are aligned with viewing area rows 481–600.

The second subframe includes passes 6–10 and utilizes light emitting device rows 2–121 while light emitting device rows 1, 122, and 123 are not used during the second subframe. On pass 6, light emitting device rows 2–121 are aligned with viewing area rows 1–120. Note that there may be a small sub-pixel shift between addressed viewing area rows 1–120 during pass 6 versus pass 1. This may be due to slight variation in alignment accuracy between the pass 6 and 1, or it may be a shift intended to allow a resolution enhancement function. But for simplicity of the discussion we will refer to pixel locations between subframes as being the same. On pass 7, light emitting device rows 2–121 are aligned with viewing area rows 121–240. On pass 8, light emitting device rows 2–121 are aligned with viewing area rows 241–360. On pass 9, light emitting device rows 2–121 are aligned with viewing area rows 361–480. On pass 10, light emitting device rows 2–121 are aligned with viewing area rows 481–600. Again, note that there may be a vertical and/or horizontal sub-pixel shift between the viewing area pixel locations of passes 1–5 versus passes 6–10.

The third subframe includes passes 11–15 and utilizes light emitting device rows 3–122 while light emitting device rows 1, 2, and 123 are not used during the third subframe. On pass 11, light emitting device rows 3–122 are aligned with viewing area rows 1–120. On pass 12, light emitting device rows 3–122 are aligned with viewing area rows 121–240. On pass 13, light emitting device rows 3–122 are aligned with viewing area rows 241–360. On pass 14, light emitting device rows 3–122 are aligned with viewing area rows 361–480. On pass 15, light emitting device rows 3–122 are aligned with viewing area rows 481–600. Note that there may be a vertical and/or horizontal sub-pixel shift between the viewing area pixel locations of passes 6–10 versus passes 11–15.

The fourth subframe includes passes 16–20 and utilizes light emitting device rows 4–123 while light emitting device rows 1–3 are not used during the fourth subframe. On pass 16, light emitting device rows 4–123 are aligned with viewing area rows 1–120. On pass 17, light emitting device rows 4–123 are aligned with viewing area rows 121–240. On pass 18, light emitting device rows 4–123 are aligned with viewing area rows 241–360. On pass 19, light emitting device rows 4–123 are aligned with viewing area rows 361–480. On pass 20, light emitting device rows 4–123 are aligned with viewing area rows 481–600. Note that there may be a vertical and/or horizontal sub-pixel shift between the viewing area pixel locations of passes 11–15 versus passes 16–20.

Some of the characteristics of the example illustrated by FIG. 9 thus include the use of four subframes, horizontal non-overlapping swaths, each pixel location being targeted multiple times per frame, each pixel location being targeted by multiple light emitting devices during a frame, and each light emitting device being directed at multiple pixel locations during a frame. Of particular note is that different light emitting device rows are used to target the same viewing area rows during a frame. For example, viewing area row 1 is targeted by light emitting device row 1 during the first subframe, by light emitting device row 2 during the second subframe, by light emitting device row 3 during the third subframe, and by light emitting device row 4 during the fourth subframe. This reduces the impact of individually weak or missing light emitting devices.

Another aspect of the method described with respect to FIG. 9 is the possibility of introducing some small shift in pixel location between the four subframes. This can be utilized to enhance the resolution of the display (for example from SVGA to UXGA). Some small amount of shifting of actual location will almost always be present due to alignment variations.

FIG. 10 is a diagram illustrating a display with details of a mapping that maps an array of light emitting devices to target pixel locations in the display according to an embodiment of the present invention such as one for an SVGA system with four subframes and diagonal swaths. This embodiment uses four subframes and two polygonal mirrors, similar to the embodiment illustrated in FIG. 9. Light emitting devices are again arranged 123 on the vertical axis by four on the horizontal axis, projecting light emitting devices that are spaced at screen pixel resolution. The vertical mirror is polygonal with ten facets, spinning at (60 Hz×4)/10=24 Hz. The horizontal mirror is polygonal spinning at (60×20)/2=120 Hz. Blanking periods are imposed.

Unlike the previous example, the swaths used in the embodiment shown in FIG. 10 are diagonal. Swath 1002 corresponds to passes 1, 6, 11, 16. Swath 1004 corresponds to passes 2, 7, 12, 17. Swath 1006 corresponds to passes 3, 8, 13, 18. Swath 1008 corresponds to passes 4, 9, 14, 19. Swath 1010 corresponds to passes 5, 10, 15, 20. During subframe 1 passes 1–5 occur. During pass 1, light emitting device rows 1–120 cover a swath that starts at viewing rows 1–120 at one end of the pass and linearly moves to rows 121–240 at the other end of the pass, as depicted in FIG. 10.

Some of the characteristics of the example illustrated by FIG. 10 thus include the use of four subframes, diagonal non-overlapping swaths, each pixel location being targeted multiple times per frame, and each light emitting device being directed at multiple pixel locations during a frame. If one advances the light emitting device rows being directed, as was done in the example of FIG. 9, then each pixel location in FIG. 10 is also targeted by multiple light emitting devices during a frame.

Figures 11, 12, 13:
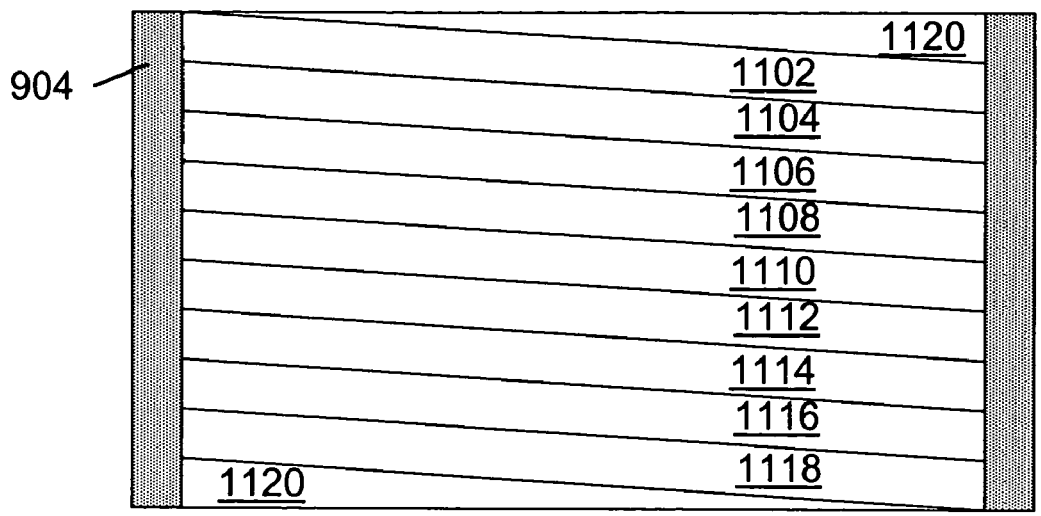
FIG. 11 is a diagram illustrating a display with details of a mapping that maps an array of light emitting devices to target pixel locations in the display according to an embodiment of the present invention such as one for a UXGA system with two subframes and diagonal swaths.
FIG. 12 is a table illustrating details of a mapping that maps an array of light emitting devices to target pixel locations in a display according to an embodiment of the present invention such as one for an SVGA system with ten subframes and stripes from interleaved light emitting devices.
FIG. 13 is a table illustrating details of a mapping that maps an array of light emitting devices to target pixel locations in a display according to an embodiment of the present invention such as one for a UXGA system with ten subframes and stripes from interleaved light emitting devices.

FIG. 11 is a diagram illustrating a display with details of a mapping that maps an array of light emitting devices to target pixel locations in the display according to an embodiment of the present invention such as one for a UXGA system with two subframes and diagonal swaths. This embodiment uses two subframes and two polygonal mirrors. Light emitting devices are arrayed in 61 rows on the vertical axis by 8 columns on the horizontal axis. The vertical mirror has M facets, and spin frequency=(60 Hz×2)/M. The horizontal mirror has N facets, and spin frequency=(60 Hz×20)/N. Blanking periods are used 214 corresponding to the regions 904 as shown. In this and other figures relative positions are indicated, but the diagrams are not necessarily to scale. The correspondence between diagonal swaths and passes in FIG. 11 is given by the following table:

| SWATH | PASSES |
| --- | --- |
| 1102 | 1, 11 |
| 1104 | 2, 12 |
| 1106 | 3, 13 |
| 1108 | 4, 14 |
| 1110 | 5, 15 |
| 1112 | 6, 16 |
| 1114 | 7, 17 |
| 1116 | 8, 18 |
| 1118 | 9, 19 |
| 1120 | 10, 20 |

Some of the characteristics of the example illustrated by FIG. 11 thus include the use of two subframes, diagonal swaths, each pixel location being targeted multiple times per frame, and each light emitting device being directed at multiple pixel locations during a frame. If one advances the light emitting device rows being directed, such as by utilizing light emitting device rows 1–60 on passes 1–10 and light emitting device rows 2–61 on passes 11–20, then each pixel location in FIG. 10 is also targeted by multiple light emitting devices during a frame.

FIG. 12 is a table illustrating details of a mapping that maps an array of light emitting devices to target pixel locations in a display according to an embodiment of the present invention such as one for an SVGA system with ten subframes and stripes from interleaving light emitting devices. Light emitting devices are arranged in an array 121 tall by 4 wide per color, with their associated dots spread out over the entire viewing surface in stripes during operation. The vertical mirror is a galvanometer mirror having a frequency of (60 Hz×10)=600 Hz. The horizontal mirror is polygonal with N facets, for 10 passes per frame, and spin frequency=(60 revolutions per second×10)/N. Blanking periods are used 214 at polygon vertices to allow for galvanometer mirror movement and settling. The light emitting devices generate dots that scan across the viewing surface 10 times in a frame, so there are 10 subframes per frame. The correspondence between stripes and passes is given by the table in FIG. 12.

Some of the characteristics of the example illustrated by FIG. 12 thus include the use of ten subframes, horizontal stripes, each pixel location being targeted multiple times per frame, each light emitting device being directed at multiple pixel locations during a frame, and each pixel location being targeted by multiple light emitting devices during a frame.

FIG. 13 is a table illustrating details of a mapping that maps an array of light emitting devices to target pixel locations in a display according to an embodiment of the present invention such as one for a UXGA system with ten subframes and stripes from interleaving LEDs. This embodiment uses ten subframes and two mirrors for inducing scanning of spots across a viewing surface. Light emitting devices are arranged in an array 120 tall by 4 wide per color, spread out over the entire viewing surface in stripes. The vertical mirror is a small deflection galvanometer mirror twitching at (60 Hz×10)=600 Hz. The horizontal mirror is polygonal with N facets, for 10 passes per frame, and spin frequency=(60 revolutions per second×10)/N. Blanking periods may be used 214 at polygon vertices to allow for galvanometer mirror movement and settling. The light emitting device spots scan across the viewing surface 10 times in a frame, so there are 10 subframes per frame; each subframe covers 10% of the pixel locations. The correspondence between stripes and passes is given by the table in FIG. 13. Each pixel location is addressed once by each beam or four times (for the four beams) during a single frame.

Some of the characteristics of the example illustrated by FIG. 13 thus include the use of ten subframes, horizontal stripes, each pixel location is a light emitting device target at least twice per frame, and each light emitting device is directed toward at least two pixel locations per frame.

CONCLUSION

Although particular embodiments of the present invention are expressly illustrated and described herein as methods or devices, it will be appreciated that discussion of one type of embodiment also generally extends to other embodiment types. For instance, the descriptions of projection methods also help describe projection system components and projection systems. It does not follow that limitations from one embodiment are necessarily read into another.

Headings are for convenience only; information on a given topic may be found outside the section whose heading indicates that topic. All claims as filed are part of the specification and thus help describe the invention, and repeated claim language may be inserted outside the claims as needed.

It is to be understood that the above-referenced embodiments are illustrative of the application for the principles of the present invention. Numerous modifications and alternative embodiments can be devised without departing from the spirit and scope of the present invention. While the present invention has been shown in the drawings and described above in connection with the exemplary embodiments of the invention, it will be apparent to those of ordinary skill in the art that numerous modifications can be made without departing from the principles and concepts of the invention as set forth in the claims.

As used herein, terms such as "a" and "the" and designations such as "light emitting device" and "directing" are inclusive of one or more of the indicated item or step. In particular, in the claims a reference to an item generally means at least one such item is present and a reference to a step means at least one instance of the step is performed.

The scope of the invention is indicated by the appended claims rather than by the foregoing description. All changes which come within the meaning and range of equivalency of the claims are to be embraced within their scope to the full extent permitted by law.

What is claimed is:

1. A projection method for directing a collection of light emitting devices toward pixel locations during a frame to make an image having pixels that are illuminated at least in part by light emitted from the directed light emitting devices, the method comprising the steps of:
    during a subframe of the frame directing at least one of the light emitting devices toward a pixel location; and
    during another subframe of the same frame directing at least one of the light emitting devices toward a sub-pixel vicinity of the same pixel location, thereby making that a sub-pixel vicinity of that pixel location a light emitting device target at least twice during that frame;
    wherein each of at least some of the light emitting devices in the collection is directed during the same frame toward at least two different pixel locations, and a light emitting device can be directed toward a pixel location regardless of whether the light emitting device emits light; and
    wherein the light emitting devices are directed toward pixel locations in stripes such that adjacent light emitting devices are directed at nonadjacent pixel locations during a subframe.

2. The method of claim 1, wherein sub-pixel vicinities of the same pixel locations are light emitting device targets more than twice during the frame.

3. The method of claim 1, wherein at least two different light emitting devices of a given color are directed toward a sub-pixel vicinity of the same pixel location during the frame.

4. The method of claim 1, wherein light emitting devices are directed toward sub-pixel vicinities of some pixel locations in swaths such that adjacent light emitting devices are directed at adjacent pixel locations during a subframe.

5. The method of claim 1, wherein the subframes are of substantially equal duration.

6. The method of claim 1, wherein a total illumination reaching a pixel location from the light emitting devices during the frame is divided substantially equally between all subframes of the frame.

7. A projection method comprising the steps of:
    during a subframe of a frame directing a light emitting device toward a pixel location; and
    during another subframe of the same frame directing a light emitting device toward a sub-pixel vicinity of the same pixel location, thereby making a sub-pixel vicinity of that pixel location a light emitting device target at least twice during that frame;
    wherein each of at least some of the light emitting devices in a collection of light emitting devices is directed during the same frame toward at least two different pixel locations, regardless of whether the light emitting device emits light, and light emitting devices are directed toward pixel locations in swaths such that adjacent light emitting devices are directed at adjacent pixel locations during a subframe; and
    wherein the swaths are diagonal such that a row of light emitting devices is directed at a selection of pixel rows which varies linearly during a subframe.

8. The method of claim 7, wherein light emitting devices are directed toward a sub-pixel vicinity of the same pixel locations during each of at least four subframes of the frame.

9. The method of claim 7, wherein a sub-pixel vicinity of each pixel location is a target of at least two different light emitting devices of a given color during the frame.

10. A projection method comprising the steps of:
during a subframe of a frame directing a light emitting device toward a pixel location; and
during another subframe of the same frame directing a light emitting device toward a sub-pixel vicinity of the same pixel location, thereby making that pixel location a light emitting device target at least twice during that frame;
wherein each of some of the light emitting devices in a collection of light emitting devices is directed during the same frame toward at least two different pixel locations, regardless of whether the light emitting device emits light, and light emitting devices are directed toward pixel locations in stripes such that adjacent light emitting devices are directed at nonadjacent pixel locations during a subframe.

11. The method of claim 10, wherein light emitting devices are directed toward pixel locations during each of at least ten subframes of the frame.

12. The method of claim 10, wherein each pixel location is a target of at least two different light emitting devices of a given color during the frame.

13. A projection system component comprising:
a frame buffer block which stores pixel data specifying desired pixel values for pixel locations in an image; and
a reordering block which reads selected pixel data from the frame buffer block and assigns the selected pixel data to corresponding light emitting devices in an array of light emitting devices, the pixel data being selected according to a mapping that maps the array of light emitting devices to target pixel locations toward which the light emitting devices will be directed, such that each pixel location is a target of at least two light emitting devices in each frame and each light emitting device is directed toward at least two pixel locations in each frame.

14. The projection system component of claim 13, further comprising a redundancy separation block which receives from the reordering block pixel data and corresponding light emitting device assignments specifying the total expected emitted light for each assigned light emitting device during a frame, and the redundancy separation block allocates those light emitting device totals among the subframes of the frame.

15. The projection system component of claim 14, wherein the allocation of a light emitting device total is partly determined by pulse width modulation of the light emitting device.

16. The projection system component of claim 14, wherein the allocation of a light emitting device total is partly determined by intensity of the light emitting device.

17. The projection system component of claim 14, wherein the allocation of light emitting device totals specifies for each light emitting device that the energy emitted from that light emitting device will be approximately equal during each subframe.

18. The projection system component of claim 14, wherein the redundancy separation block comprises lookup tables.

19. The projection system component of claim 13, wherein the frame buffer block stores at least two frames of pixel data.

20. A projection system comprising:
a frame buffer block which stores pixel data specifying desired pixel values for pixel locations in an image;
a reordering block which reads selected pixel data from the frame buffer block and assigns the selected pixel data to corresponding light emitting devices in an array of light emitting devices, the pixel data being selected according to a mapping that maps the array of light emitting devices to target pixel locations toward which the light emitting devices will be directed, such that the sub-pixel vicinity of each pixel location is a light emitting device target at least twice per frame and each light emitting device is directed toward at least two pixel locations per frame;
a redundancy separation block which receives from the reordering block pixel data and corresponding light emitting device assignments specifying the total expected emitted light for each assigned light emitting device during a frame, and the redundancy separation block allocates those totals among the subframes of the frame;
an array of light emitting devices directed according to the signals provided by the frame buffer block, the reordering block, and the redundancy separation block; and
optics for guiding light from the light emitting devices toward the pixel locations.

21. The projection system of claim 20, wherein the array of light emitting devices comprises red light emitting devices, green light emitting devices, and blue light emitting devices.

22. The projection system of claim 21, wherein the red, green, and blue light emitting devices define an RGB light emitting device color space, and the system further comprises a colormapper block which converts input color space data into the RGB light emitting device color space from another color space.

23. The projection system of claim 22, wherein the colormapper block converts NTSC RGB data into the RGB light emitting device color space.

24. The projection system of claim 20, wherein the array of light emitting devices comprises at least one of the following types of light emitting devices: light emitting diodes, semiconductor lasers, vertical cavity surface emitting lasers.

25. The projection system of claim 20, wherein the optics comprise a rotating polygonal mirror.

26. The projection system of claim 25, wherein the optics comprise a rotating polygonal mirror for vertical control of light emitted from light emitting devices and another rotating polygonal mirror for horizontal control of light emitted from light emitting devices.

27. The projection system of claim 25, wherein the light emitting devices are turned off during blanking periods that correspond to vertices of the rotating polygonal mirror, thereby allowing for galvanometer mirror movement and settling.

28. The projection system of claim 25, further comprising a display having pixel locations toward which the light emitting devices are directed.

29. A projection system comprising:
a frame buffer means for storing pixel data specifying desired pixel values for pixel locations in an image;
a reordering means for reading selected pixel data from the frame buffer means and assigning the selected pixel data to corresponding light emitting devices in an array of light emitting devices, the pixel data being selected according to a mapping that maps the array of light emitting devices to target pixel locations toward which the light emitting devices will be directed, such that each pixel location is a target of at least two light emitting devices in each frame and each light emitting device is directed toward at least two pixel locations in each frame; and a redundancy separation means for receiving from the reordering means pixel data and corresponding light emitting device assignments specifying the total expected emitted light for each assigned light emitting device during a frame, and the redundancy separation means allocates those light emitting device totals among the subframes of the frame.

30. The projection system of claim 29, wherein the allocation of a light emitting device total is partly determined by pulse width modulation of the light emitting device.

31. The projection system of claim 29, wherein the allocation of a light emitting device total is partly determined by intensity of the light emitting device.

32. The projection system of claim 29, wherein the allocation of light emitting device totals specifies for each light emitting device that the energy emitted from that light emitting device will be approximately equal during each subframe.

* * * * *